United States Patent
Le et al.

(10) Patent No.: US 10,021,028 B2
(45) Date of Patent: Jul. 10, 2018

(54) CONTROLLING INCOMING TRAFFIC

(71) Applicant: INTERNATIONAL BUSINESS MACHINES CORPORATION, Armonk, NY (US)

(72) Inventors: Franck Le, White Plains, NY (US); Vasileios Pappas, New York, MA (US); Mudhakar Srivatsa, White Plains, NY (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 14/305,561

(22) Filed: Jun. 16, 2014

(65) Prior Publication Data
US 2015/0365326 A1    Dec. 17, 2015

(51) Int. Cl.
| | |
|---|---|
| H04L 12/803 | (2013.01) |
| H04L 12/801 | (2013.01) |
| H04W 28/02 | (2009.01) |
| H04L 12/26 | (2006.01) |

(52) U.S. Cl.
CPC ........ H04L 47/122 (2013.01); H04L 43/0876 (2013.01); H04L 47/127 (2013.01); H04L 47/14 (2013.01); H04W 28/02 (2013.01)

(58) Field of Classification Search
None
See application file for complete search history.

(56) References Cited

U.S. PATENT DOCUMENTS

| | | | |
|---|---|---|---|
| 6,363,056 B1 * | 3/2002 | Beigi | ............ H04L 41/12 370/252 |
| 7,299,294 B1 * | 11/2007 | Bruck | ......... H04L 29/12216 709/201 |
| 8,045,566 B2 | 10/2011 | Roeder | |
| 8,131,877 B2 | 3/2012 | Hutchison et al. | |
| 8,477,597 B2 | 7/2013 | Zhang et al. | |

(Continued)

OTHER PUBLICATIONS

Awduche, D., et al. "Overview and Principles of Internet Traffic Engineering" Network Working Group. May 2002. http://<www.rfc-editor.org/rfc/rfc3/rfc3272.txt> (67 Pages).

(Continued)

*Primary Examiner* — Chirag Shah
*Assistant Examiner* — Srinivasa Reddivalam
(74) *Attorney, Agent, or Firm* — Tutunjian & Bitetto, P.C.; Jennifer R. Davis

(57) ABSTRACT

A method and system are provided for controlling a volume of incoming traffic into a network having a plurality of ingress routers. The method includes monitoring respective loads of the plurality of ingress routers. The method further includes selecting a particular one of the plurality of ingress routers to receive future incoming traffic based on at least the respective loads of the plurality of ingress routers. The method also includes creating a mapping between an internal source IP address and a client IP address. The internal source IP address relates to the particular one of the plurality of routers. The client IP address is for a client device accessing the Internet through the network. The method additionally includes rewriting a destination IP address of the incoming traffic based on the mapping. At least the monitoring, selecting, and creating steps are performed by a controller.

20 Claims, 4 Drawing Sheets

(56) References Cited

U.S. PATENT DOCUMENTS

| | | | |
|---|---|---|---|
| 2001/0019554 A1* | 9/2001 | Nomura | H04L 45/50 370/389 |
| 2002/0002625 A1 | 1/2002 | Vange et al. | |
| 2008/0062891 A1* | 3/2008 | Van der Merwe | H04L 45/04 370/254 |
| 2008/0247382 A1* | 10/2008 | Verma | H04L 65/80 370/352 |
| 2009/0254638 A1* | 10/2009 | Spatscheck | H04L 41/08 709/220 |
| 2009/0307334 A1 | 12/2009 | Maltz et al. | |
| 2010/0251335 A1* | 9/2010 | Srisuresh | G06F 15/16 726/3 |
| 2011/0044167 A1* | 2/2011 | Kalonji | H04L 47/15 370/230.1 |
| 2011/0267954 A1* | 11/2011 | Seetharaman | H04L 43/026 370/241 |
| 2012/0314575 A1 | 12/2012 | Frank et al. | |
| 2014/0192645 A1* | 7/2014 | Zhang | H04L 47/12 370/235 |
| 2014/0310417 A1* | 10/2014 | Sorenson, III | H04L 67/1002 709/226 |
| 2014/0310418 A1* | 10/2014 | Sorenson, III | H04L 67/1002 709/226 |

OTHER PUBLICATIONS

Beijnum, I. "Building Reliable Networks with the Border Gateway Protocol" O'Reilly Online Catalog, BGP, Chapter 6. Sep. 2002. <http://oreilly.com/catalog/bgp/chapter/ch06.html> (28 Pages).

Breitbart, Y., et al. "Efficiently Monitoring Bandwidth and Latency in IP Networks" Proceedings IEEE INFOCOM 2001, The Conference on Computer Communications, Twentieth Annual Joint Conference of the IEEE Computer and Communications Societies. Apr. 2001. (10 Pages).

Feamster, N., et al. "Guidelines for Interdomain Traffic Engineering" Computer Communication Review (ACM SIGCOMM). vol. 33. No. 5. Oct. 2003. (12 Pages).

Greenberg, A., et al. "A Clean Slate 4D Approach to Network Control and Management★" Computer Communication Review (ACM SIGCOMM). vol. 35, No. 5, Oct. 2005. (12 Pages).

Mahajan, R., et al. "Towards Coordinated Interdomain Traffic Engineering" SIGCOMM Workshop on Hot Topics in Networking. 2004. (6 Pages).

Wang, N., et al. "An Overview of Routing Optimization for Internet Traffic Engineering" IEEE Communications Surveys & Tutorials • 1st Quarter, vol. 10, No. 1. Oct. 2008. pp. 36-56.

* cited by examiner

CONTROLLING INCOMING TRAFFIC

BACKGROUND

Technical Field

The present invention relates generally to networks and, in particular, to controlling incoming traffic into a network.

Description of the Related Art

Networks are increasingly connected to multiple providers for reliability purposes, and one of the network operators' main objectives is to control (e.g., load balance) the incoming traffic across the ingress border routers to lower transit costs, avoid network congestion, offer better performances, and withstand traffic surges (e.g., flash crowds).

However, the tools network operators currently have at their disposal are very rudimentary. Existing methods for controlling incoming traffic are manual, error prone, vulnerable to instabilities, and provide unpredictable outcomes.

The current protocols allow operators to control the outgoing traffic but a systematic solution for controlling incoming traffic is urgently lacking.

SUMMARY

According to an aspect of the present principles, there is provided a method for controlling a volume of incoming traffic into a network having a plurality of ingress routers. The method includes monitoring respective loads of the plurality of ingress routers. The method further includes selecting a particular one of the plurality of ingress routers to receive future incoming traffic based on at least the respective loads of the plurality of ingress routers. The method also includes creating a mapping between an internal source IP address and a client IP address. The internal source IP address relates to the particular one of the plurality of routers. The client IP address is for a client device accessing the Internet through the network. The method additionally includes rewriting a destination IP address of the incoming traffic based on the mapping. At least the monitoring, selecting, and creating steps are performed by a controller.

According to another aspect of the present principles, there is provided a computer readable storage medium including a computer readable program for controlling a volume of incoming traffic into a network having a plurality of ingress routers. The computer readable program when executed on a computer causes the computer to perform the following steps. Respective loads of the plurality of ingress routers are monitored. A particular one of the plurality of ingress routers is selected to receive future incoming traffic based on at least the respective loads of the plurality of ingress routers. A mapping is created between an internal source IP address and a client IP address. The internal source IP address relates to the particular one of the plurality of routers. The client IP address is for a client device accessing the Internet through the network. A destination IP address of the incoming traffic is rewritten based on the mapping. At least the monitoring, selecting, and creating steps are performed by a controller.

According to yet another aspect of the present principles, there is provided a system for controlling a volume of incoming traffic into a network. The system includes a plurality of ingress routers for the network. The system further includes a controller for monitoring respective loads of the plurality of ingress routers, selecting a particular one of the plurality of ingress routers to receive future incoming traffic based on at least the respective loads of the plurality of ingress routers, and creating a mapping between an internal source IP address and a client IP address. The internal source IP address relates to the particular one of the plurality of routers. The client IP address is for a client device accessing the Internet through the network. The particular one of the plurality of ingress routers rewrites a destination IP address of the incoming traffic based on the mapping.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to controlling incoming traffic into a network.

In an embodiment, network entities at the perimeter of a network rewrite the source Internet Protocol (IP) address of outgoing traffic such that the replies can enter the network through the desired border routers.

In an embodiment, the network entities can predict the volume of incoming traffic of a given flow (e.g., based on historical data, external information, and/or so forth) and use this information to rewrite the source IP address. As an example, a HTTP reply from a news website can be on the order of 100 KB. In contrast, a HTTP request to download a particular software program can be in the range of several MB of incoming traffic. As such, based on the destination IP address (i.e., server IP address) of a request, the network entities can determine the most appropriate ingress routers where the reply should enter the network (e.g., to achieve load balancing).

Thus, in an embodiment, source IP addresses for reply packets are rewritten to enter a desired ingress router. In an embodiment, the present principles can be implemented using a software defined network. In an embodiment, a controller has a global view of the network, including the load of each ingress border router. The controller can access counters at ingress routers and select source IP address accordingly. The controller can create "rewrite rules". For example, source IP addresses can be allocated taking into account destination IP address (e.g., a small file size (e.g., a website) versus a large file size (e.g., an iso image)). For TCP connections, the address rewriting happens consistently for each flow (or even for each destination address).

Hence, when a new flow (e.g., HTTP request) is initiated by a client in the network, the controller can determine the rewriting rules for the source IP address. For example, if the network has two border routers X and Y advertising 10.1/16 and 10.2/16 to their providers respectively, and the router X is overloaded, then the controller should create a state to rewrite the source IP address of the new flow to be in the 10.2/16 range (e.g., 10.2.1.1). This will ensure that the reply to this flow will be entering the network through router Y. In an embodiment, the controller can create the rules so that at the perimeter, the appropriate IP fields are updated and the reply can reach the client.

Figure 1:
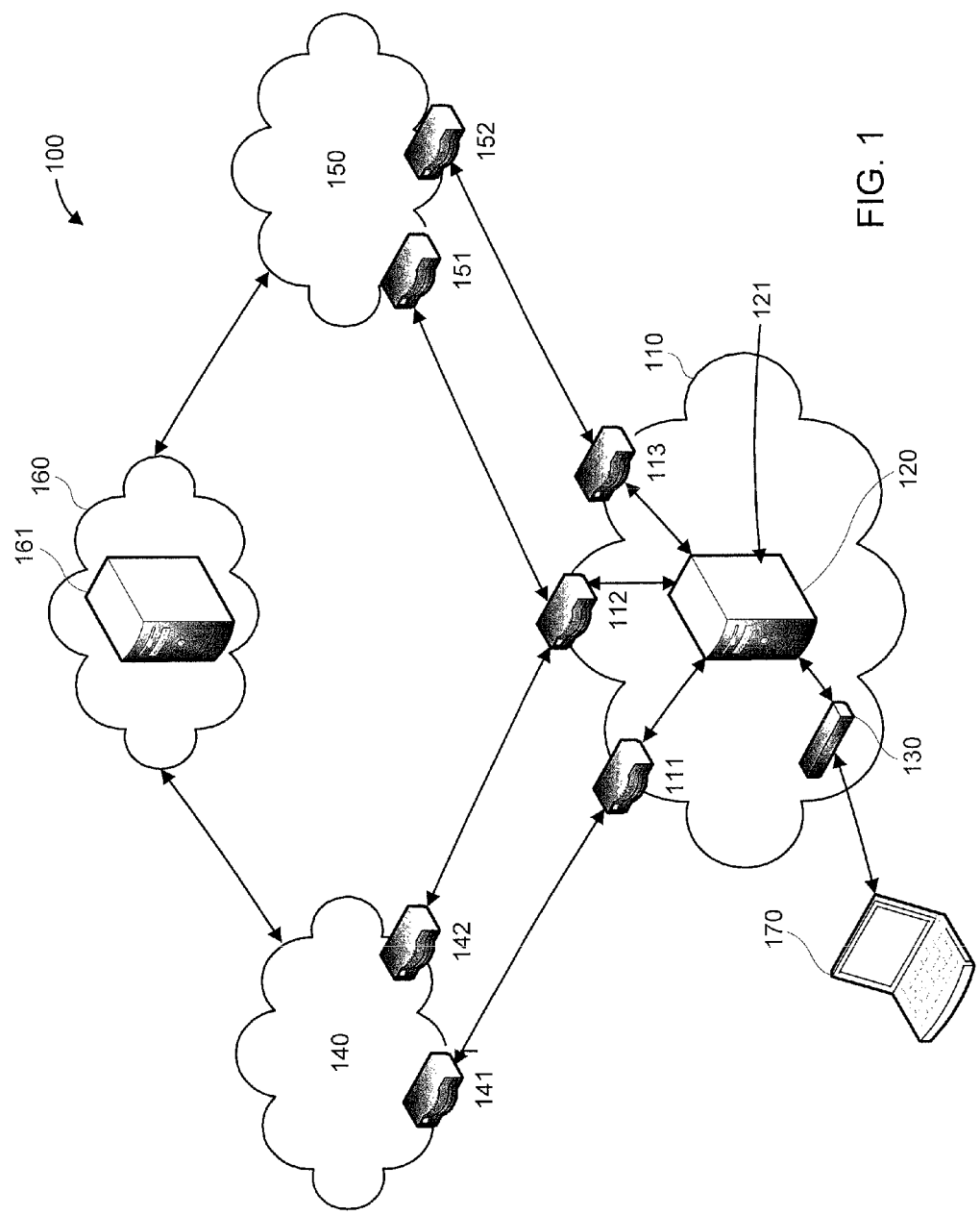
FIG. 1 shows an exemplary environment 100 to which the present principles can be applied, in accordance with an embodiment of the present principles.

FIG. 1 shows an exemplary environment 100 to which the present principles can be applied, in accordance with an embodiment of the present principles. The environment 100 includes a network 110, border routers 141 and 142 corresponding to an Internet Service Provider ISP1 network 140, border routers 151 and 152 corresponding to an Internet Service Provider ISP2 network 150, and a server 161 accessible through the Internet 160. The network 110 includes border routers 111, 112, and 113, a network controller (e.g., processor) 120, and a switch 130. The network controller 120 includes a memory 121. A client 170 accesses the server 161 though the Internet 160 and network 140 and/or network 150.

It is to be appreciated that while the network controller 120 is shown as a standalone element in network 110, in other embodiments, the network controller 120 can be incorporated into one or more other elements of network 110. For example, the network controller 120 can be incorporated into the switch 130 and/or one or more of the border routers 111, 112, and 113. These and other variations of environment 100 are readily contemplated by one of ordinary skill in the art given the teachings of the present principles provided herein, while maintaining the spirit of the present principles.

Figure 2:
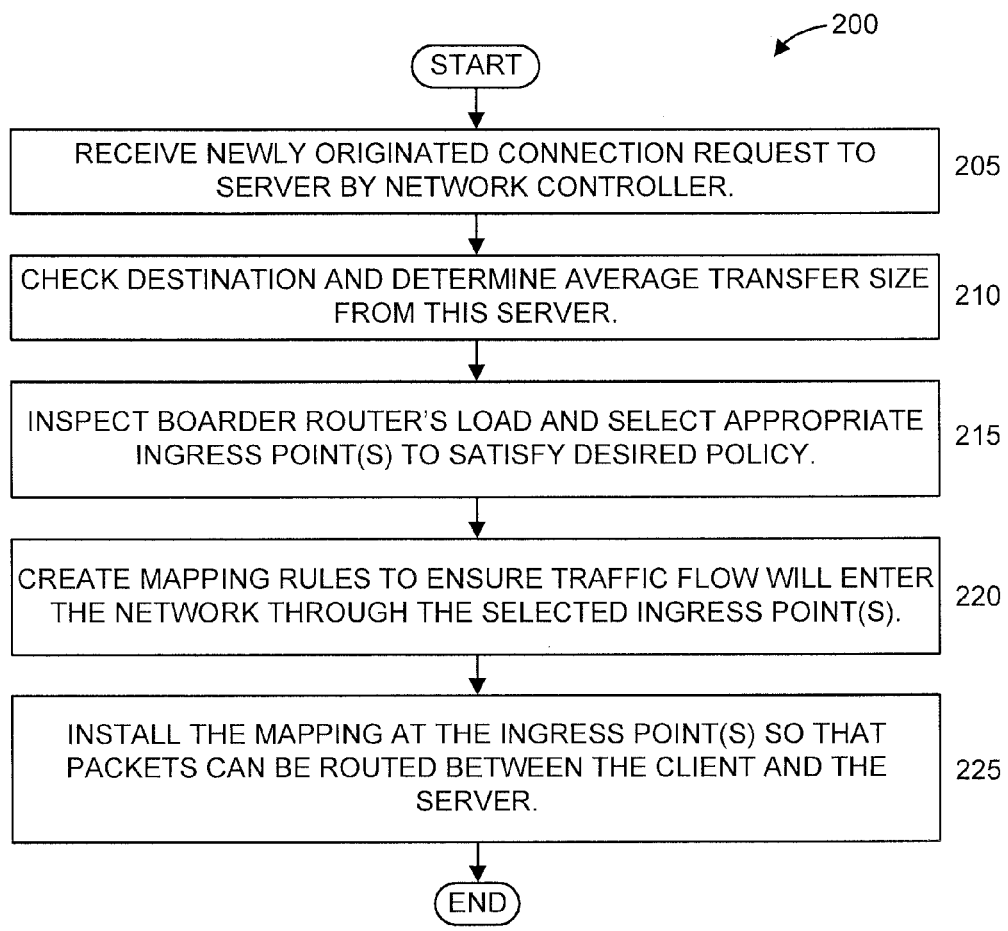
FIG. 2 shows an exemplary method 200 for controlling incoming traffic for a network, in accordance with an embodiment of the present principles.

FIG. 2 shows an exemplary method 200 for controlling incoming traffic for a network, in accordance with an embodiment of the present principles.

At step 205, receive a newly originated connection request to the server 161 by the network controller 120.

At step 210, check destination IP address and determine average transfer size from this server 161.

At step 215, inspect boarder router's load and select appropriate ingress point(s) to satisfy desired policy.

At step 220, create mapping rules to ensure traffic flow will enter the network 110 through the selected ingress point(s).

At step 225, install the mapping at the ingress point(s) so that packets can be routed between the client 170 and the server 161.

For the sake of clarity and illustration, a detailed example of an implementation of method 200 is described hereinafter with respect to method 300. Method 300 is shown and described with respect to FIGS. 3 and 4.

Figure 3:
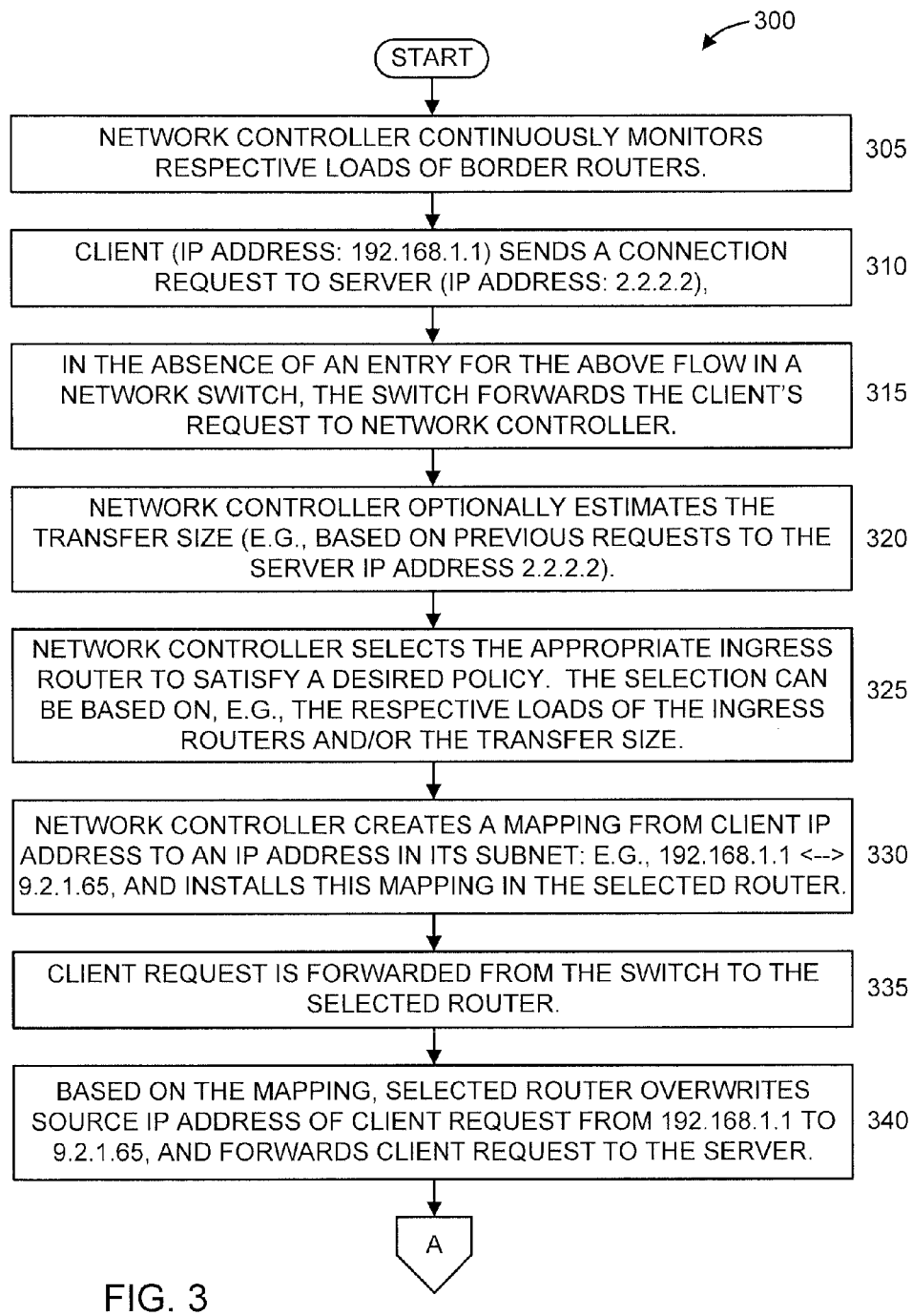
FIGS. 3 and 4 show another exemplary method 300 for controlling incoming traffic for a network, in accordance with an embodiment of the present principles.
Figure 4:
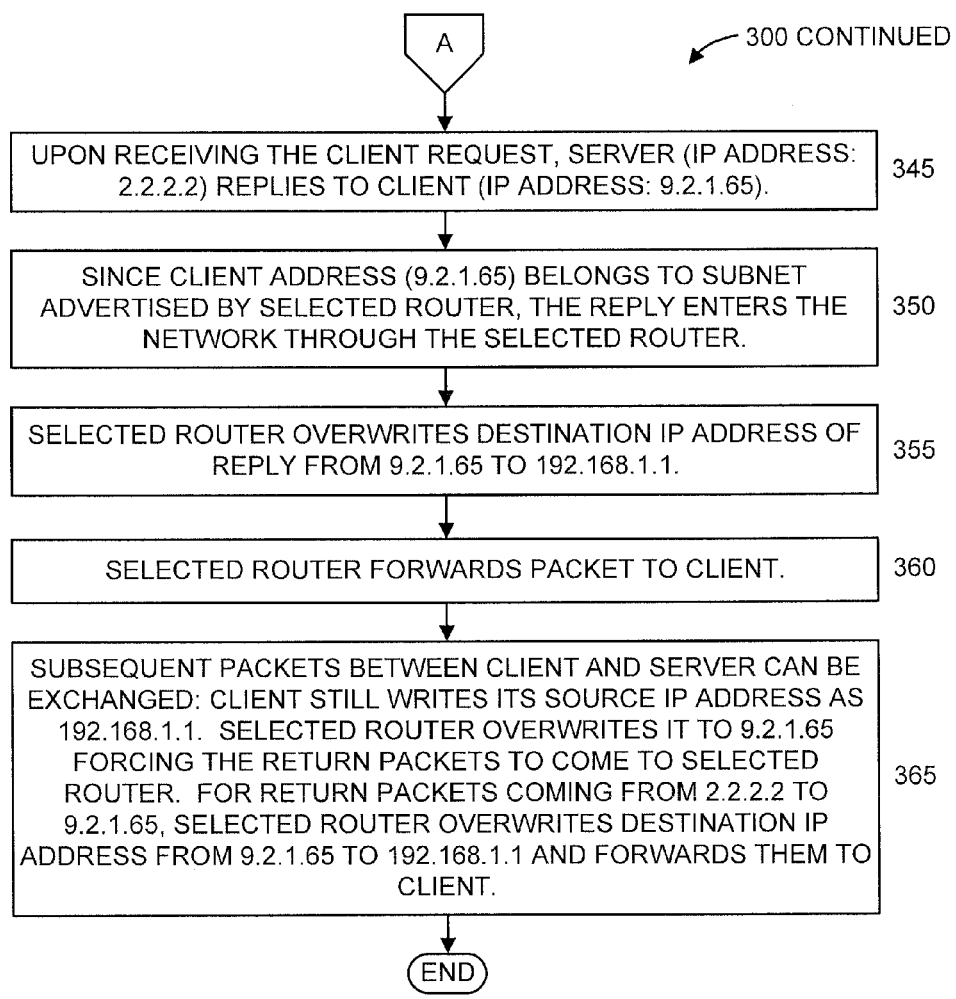

FIGS. 3 and 4 show another exemplary method 300 for controlling incoming traffic for a network, in accordance with an embodiment of the present principles.

At step 305, the network controller 120 continuously monitors the respective loads of the border routers 111, 112, and 113.

At step 310, client 170 (IP address: 192.168.1.1) sends a connection request to server 161 (IP address: 2.2.2.2).

At step 315, in the absence of an entry for the above flow in the switch 130, the switch 130 forwards the client's request to the network controller 120.

At step 320, the network controller 120 optionally estimates the transfer size (e.g., based on previous requests to the server IP address 2.2.2.2).

At step 325, the network controller 120 selects the appropriate ingress border router (from among routers 111, 112, and 113) to satisfy a desired policy (e.g., promulgated by a network administrator). The selection can be based on, e.g., the respective loads of the ingress routers and/or the transfer size. Of course, the selection can be further based on other considerations readily determined by one of ordinary skill in the art, given the teachings of the present principles provided herein. For illustration purposes, we assume router 111 is the selected router. The router 111 advertises the prefix 9.2.1.0/24 to ISP1 network 140.

At step 330, the network controller 120 creates a mapping from the client IP address to an IP address in its subnet: e.g., 192.168.1.1←→9.2.1.65, and installs this mapping in the selected router 111.

At step 335, the client request is forwarded from the switch 130 to the selected router 111.

At step 340, based on the mapping created in step 330, the selected router 111 overwrites the source IP address of the client request from 192.168.1.1 to 9.2.1.65, and then forwards client request to the server 161.

At step 345, upon receiving the client request, the server 161 (IP address 2.2.2.2) replies to the client 170 (IP address: 9.2.1.65).

At step 350, since the client address (9.2.1.65) belongs to the subnet advertised by selected router 111, the reply enters the network 110 through the selected router 111.

At step 355, the selected router 111 overwrites the destination IP address of the reply from 9.2.1.65 to 192.168.1.1.

At step 360, the selected router 111 forwards the packet to the client 170.

At step 365, subsequent packets between the client 170 and server 161 can be exchanged: The client 170 still writes its source IP address as 192.168.1.1. The selected router 111 overwrites it (i.e., source IP address 192.168.1.1) to 9.2.1.65 forcing the return packets to come to the selected router 111. For return packets coming from 2.2.2.2 to 9.2.1.65, the selected router 111 overwrites the destination IP address from 9.2.1.65 to 192.168.1.1 and forwards them to the client 170.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for controlling a volume of incoming traffic into a network having a plurality of ingress routers, the method comprising:
   monitoring respective loads of the plurality of ingress routers;
   selecting a particular one of the plurality of ingress routers to receive future incoming traffic based on at least the respective loads of the plurality of ingress routers and a transfer size estimate determined based on previous requests to a particular server IP address, the selecting comprising controlling a path of reply traffic into the network by rewriting a source IP address of outgoing traffic;
   creating rewrite rules for an internal source IP address and a mapping between the internal source IP address and a client IP address, the internal source IP address relating to the particular one of the plurality of routers, the client IP address being for a client device accessing the Internet through the network; and
   rewriting the client IP address of the incoming traffic based on the mapping,
   wherein at least said monitoring, selecting, and creating steps are performed by a controller.

2. The method of claim 1, wherein said selecting step is further based on predictions of future loads on the plurality of ingress routers.

3. The method of claim 1, wherein said selecting step is further based on an expected reply size of a reply to a request issued by the client device with respect to a remote server.

4. The method of claim 1, wherein the internal source IP address belongs to a subnet of the network that is advertised by the particular one of the plurality of ingress routers.

5. The method of claim 1, wherein the mapping is installed in the particular one of the plurality of routers.

6. The method of claim 1, wherein said rewriting step is performed by the particular one of the plurality of routers.

7. The method of claim 1, wherein said rewriting step rewrites the client IP address of the incoming traffic to the internal source IP address.

8. The method of claim 7, further comprising, subsequent to said step of rewriting the client IP address, rewriting the internal source IP address to the client IP address for a reply received for the client device from the server.

9. A computer readable storage medium comprising a computer readable program for controlling a volume of incoming traffic into a network having a plurality of ingress routers, wherein the computer readable program when executed on a computer causes the computer to perform the steps of:
   monitoring respective loads of the plurality of ingress routers;
   selecting a particular one of the plurality of ingress routers to receive future incoming traffic based on at least the respective loads of the plurality of ingress routers and a transfer size estimate determined based on previous requests to a particular server IP address, the selecting comprising controlling a path of reply traffic into the network by rewriting a source IP address of outgoing traffic;
   creating rewrite rules for an internal source IP address and a mapping between the internal source IP address and a client IP address, the internal source IP address relating to the particular one of the plurality of routers, the client IP address being for a client device accessing the Internet through the network; and
   rewriting the client IP address of the incoming traffic based on the mapping,
   wherein at least said monitoring, selecting, and creating steps are performed by a controller.

10. The computer readable storage medium of claim 9, wherein said selecting step is further based on predictions of future loads on the plurality of ingress routers.

11. The computer readable storage medium of claim 9, wherein said selecting step is further based on an expected reply size of a reply to a request issued by the client device with respect to a remote server.

12. The computer readable storage medium of claim 9, wherein the internal source IP address belongs to a subnet of the network that is advertised by the particular one of the plurality of ingress routers.

13. The computer readable storage medium of claim 9, wherein the mapping is installed in the particular one of the plurality of routers.

14. The computer readable storage medium of claim 9, wherein said rewriting step is performed by the particular one of the plurality of routers.

15. The computer readable storage medium of claim 9, wherein said rewriting step rewrites the client IP address of the incoming traffic to the internal source IP address.

16. The computer readable storage medium of claim 15, further comprising, subsequent to said step of rewriting the client IP address, rewriting the internal source IP address to the client IP address for a reply received for the client device from the server.

17. A system for controlling a volume of incoming traffic into a network, the system comprising:
   a plurality of ingress routers for the network; and
   a controller for monitoring respective loads of the plurality of ingress routers, selecting a particular one of the plurality of ingress routers to receive future incoming traffic based on at least the respective loads of the plurality of ingress routers and a transfer size estimate determined based on previous requests to a particular server IP address, and creating rewrite rules for an internal source IP address and a mapping between the internal source IP address and a client IP address, the selecting comprising controlling a path of reply traffic into the network by rewriting a source IP address of outgoing traffic,
   wherein the internal source IP address relates to the particular one of the plurality of routers, the client IP address is for a client device accessing the Internet through the network, and the particular one of the plurality of ingress routers rewrites the client IP address of the incoming traffic based on the mapping.

18. The system of claim 17, wherein the controller is a standalone element located within the network and configured to communicate with at least the plurality of ingress routers.

19. The system of claim 17, wherein the controller is located within at least one of the plurality of ingress routers.

20. The system of claim 17, wherein the controller is located within a network switch configured to communicate with the plurality of ingress routers.

* * * * *